(12) United States Patent
Castel et al.

(10) Patent No.: US 6,389,951 B1
(45) Date of Patent: May 21, 2002

(54) BRAKE BOOSTER

(75) Inventors: Philippe G. Castel, Paris; Jean-Michel Dubus, Port Mort; Bernard Petin, Claye Souilly; Joseph M. Genaudeau, Noisiel, all of (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/578,332

(22) Filed: May 25, 2000

(51) Int. Cl.$^7$ .................................................. F15B 9/10
(52) U.S. Cl. ......................................................... 91/376 R
(58) Field of Search ........................................ 91/376 R

(56) References Cited

U.S. PATENT DOCUMENTS 5,337,650 A   8/1994  Uyama
5,526,729 A   6/1996  Ando et al.
5,553,530 A   9/1996  Endo et al.

FOREIGN PATENT DOCUMENTS

EP          0242269       10/1987

*Primary Examiner*—Edward K. Look
*Assistant Examiner*—Michael Leslie
(74) *Attorney, Agent, or Firm*—Robert M. Sigler

(57) ABSTRACT

This brake booster comprises an enclosure (40), a diaphragm (42) dividing the enclosure into a front chamber (46) connected to a source of vacuum and a rear chamber (48), a piston (44) that can move axially in the enclosure and on which the diaphragm is mounted, a plunger (50) mounted so that it can move axially in the piston between a forward unstable braking position and a retreated stable position of rest, and a valve (54) intended to collaborate with seats (56, 58) on the piston and on the plunger. The or each seat (56) on the piston (44) is formed on the edge of a passage (60, 62) allowing the said chambers (46, 48) to communicate.

3 Claims, 4 Drawing Sheets

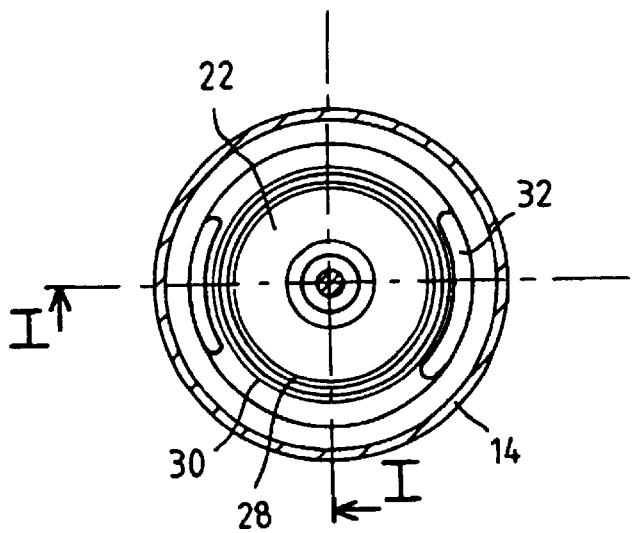
PRIOR ART
FIG. 2
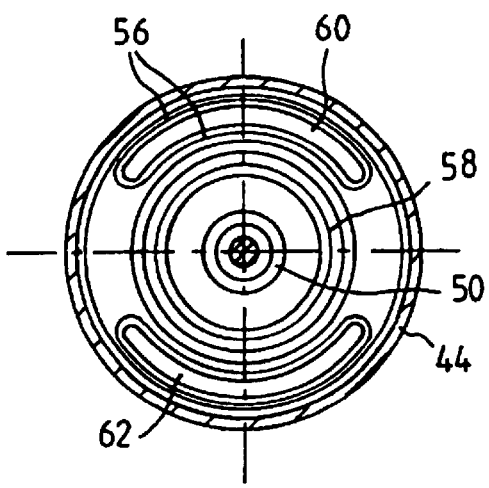
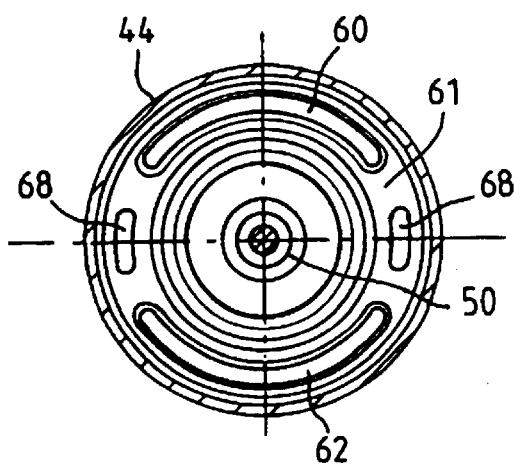
FIG. 4  FIG. 6

BRAKE BOOSTER

TECHNICAL FIELD

The present invention relates to braking systems for motor vehicles and relates more specifically to a brake booster.

BACKGROUND OF THE INVENTION

Braking systems generally comprise a master cylinder intended to apply the pressure of the brake fluid to the brakes of a vehicle when a brake pedal is actuated. Inserted between the brake pedal and the master cylinder is a vacuum-type brake booster. Such a brake booster comprises, as is known, an enclosure, a diaphragm dividing the enclosure into a front chamber which is equipped with means of connection to a source of vacuum and into a rear chamber, a piston that can move axially in the enclosure and on which the diaphragm is mounted, a plunger mounted so that it can move axially in the piston under the control of a brake pedal between a forward unstable braking position and a retreated stable position of rest, and a valve collaborating with seats on the piston and on the plunger so as, on the one hand, to isolate the rear chamber from the ambient atmosphere and place it in communication with the front chamber when the plunger is in the position of rest and, on the other hand, to isolate the rear chamber from the front chamber and place the rear chamber in communication with the ambient atmosphere during braking.

Such a booster allows the braking force applied to the brake pedal to be multiplied by a multiplication factor which may, for example, be as high as 9. In this type of brake booster, the piston has a single seat of circular shape lying so that it is concentric with the seat borne by the plunger. The drawback of such an arrangement is that it disturbs the flow of air towards the front chamber.

SUMMARY OF THE INVENTION

The subject of the invention is therefore a brake booster of the aforementioned type, characterized in that each seat on the piston is formed on the edge of a passage allowing the communication between the chambers.

The shape of the seats therefore corresponds to the shape of the passages, and this makes it possible to make the flow of air between the chambers more uniform.

Furthermore, in one embodiment, it makes it possible to provide more direct passages for the air for filling the rear chamber with the air entering the booster from the outside.

The brake booster according to the invention may further comprise one or more of the following features, taken in isolation or in any technically feasible combination:

- each passage has a transverse cross section in the shape of a truncated annulus;
- the brake booster has two passages allowing the said chambers to communicate, these passages being arranged symmetrically with respect to the axis of the piston;
- it has a single seat comprising two lateral parts each formed on the edge of one of the said passages and connected by a circular part coaxial with the plunger;
- the brake booster comprises a first set of primary passages formed in a bore of the piston in which the plunger slides and which open towards the rear chamber and a second set of secondary passages designed to increase the flow of air between the rear and front chambers when the plunger returns to the position of rest;
- the secondary passages open into the piston in a zone which lies in a plane which lies forward of a plane defined by the corresponding seats.

Another subject of the invention is a piston for a brake booster as defined hereinabove, comprising an internal bore in which a plunger is intended to be mounted so that it can slide between a forward unstable braking position and a retreated stable position of rest, at least one passage for establishing communication between a front chamber and a rear chamber which are delimited by a diaphragm fixed to the piston, at least one seat intended to collaborate with a valve mounted on the piston for closing the or each passage upon braking, the bore having second passages for establishing communication, upon braking, between the rear chamber and the ambient atmosphere, characterized in that the or each seat is formed on the edge of one of the said at least one passage that allows the said chambers to communicate.

Advantageously, each passage which allows the chambers to communicate has a transverse cross section in the shape of a truncated annulus.

As a preference, the piston comprises additional passages designed to increase the flow of air between the rear and front chambers when the plunger returns to the position of rest.

BRIEF DESCRIPTION OF THE DRAWINGS

The present invention will now be described, by way of example, with reference to the accompanying drawings, in which

FIG. 2 is a view in section on the line 2—2 of part of the booster of FIG. 1;

FIG. 4 is a view in section on the line 4—4 of part of the booster of FIG. 3;

FIG. 6 is a partial view in cross section of another illustrative embodiment of a brake booster according to the invention.

DESCRIPTION OF THE PREFERRED EMBODIMENT

Figure 1:
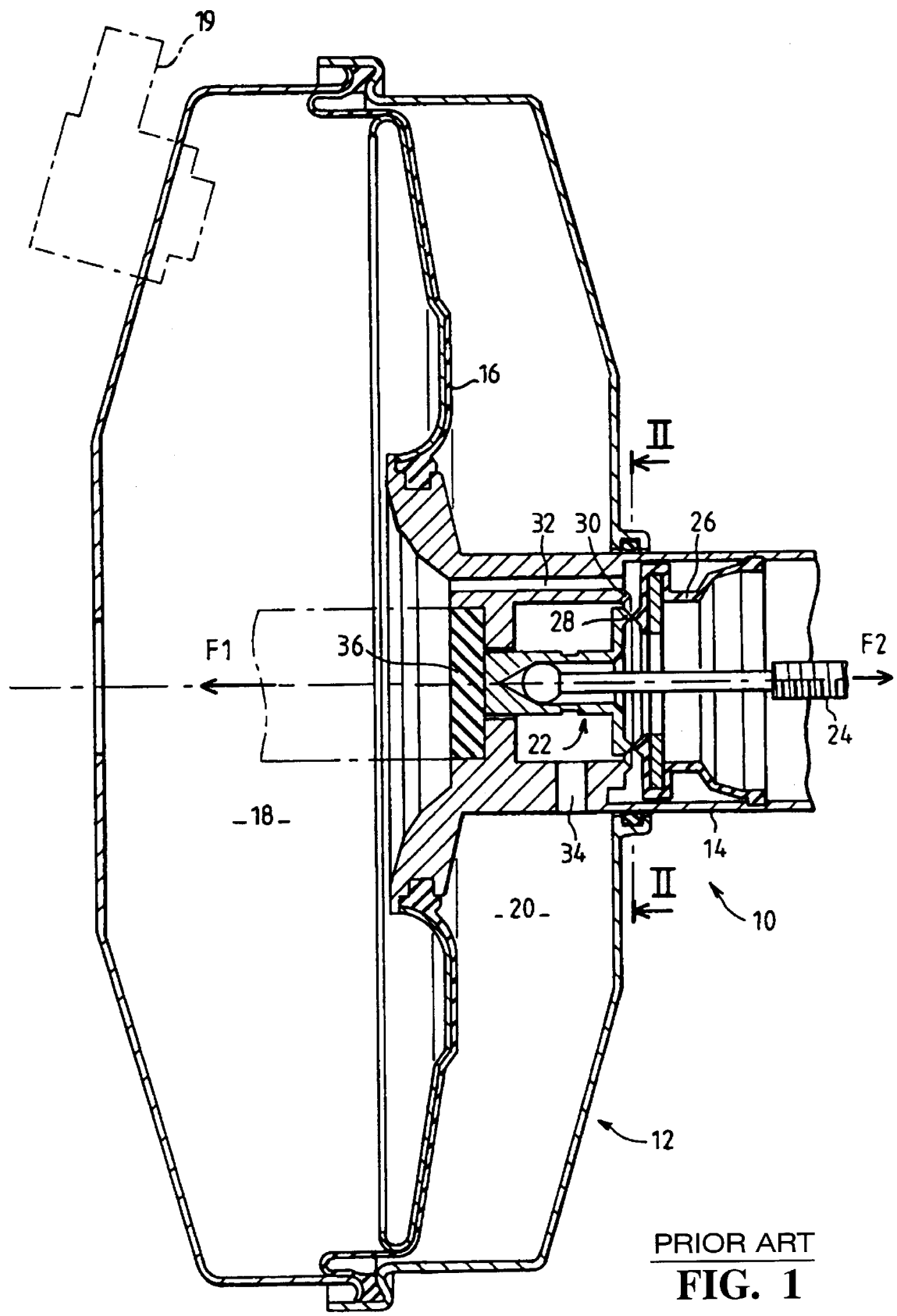
FIG. 1 is a diagrammatic view in longitudinal section of a brake booster according to the prior art.

FIG. 1 depicts a sectioned view of a brake booster according to the state of the art, denoted by the overall numerical reference 10.

It comprises: a closed enclosure 12; a piston 14 that can move axially in the enclosure and part of which communicates with the ambient atmosphere; a diaphragm 16 borne by the piston 14 and dividing the enclosure 12 into a front chamber 18 equipped with means 19 of connection to a source of vacuum (not depicted) and a rear chamber 20 in which the prevailing pressure varies; a plunger 22 mounted so that it can move axially in the piston 14 and to which an operating rod 24 connected to the brake pedal of a motor vehicle is connected; and a valve 26 collaborating with seats 28 and 30 borne by the plunger and the piston, respectively.

There are passages 32 and 34 in the piston 14 to place the front chamber 18 in communication with the rear chamber 20 and to place the chamber 20 in communication with the ambient atmosphere, respectively, under the control of the plunger 22 and of the valve 26.

The plunger 22 is mounted so that it can move in the piston 14 between a forward braking position and a retreated position of rest. Elastic means urge the plunger 22 towards the position of rest.

In FIG. 1, the brake booster 10 is depicted in its position of rest. In this position, the valve 26 rests on the seat 28 or "air seat" of the plunger 22 and is distant from the seat 30 or "vacuum seat" of the piston 14.

As a consequence, the front 18 and rear 20 chambers are in communication via passages 32 and 34 and are at the same pressure.

When force is exerted on the brake pedal, the plunger 22 moves in the direction depicted by the arrow $F_1$, that is to say in the direction of the front chamber 18. During this movement, the plunger 22 exerts a force on the central part of an elastically deformable reaction disc 36 arranged in a cup (not depicted). The resulting peripheral deformation of the disc 36 gives rise to a movement of the piston 14 in the direction represented by the arrow $F_2$, which causes the seat 30 of the piston to press against the valve 26 and the latter to move in the direction $F_2$.

This movement causes the valve 26 to move away from the seat 28 of the plunger 22 and therefore causes the rear chamber 20 to be placed in communication with the atmosphere via the passage 34.

As can be seen in FIG. 2, the seats 28 and 30 consist respectively of circular ridges borne respectively by the plunger 22 and by the piston 14.

As mentioned earlier, this arrangement, and particularly the shape of the seat 30 on the piston, causes turbulence particularly in the stream of air flowing in from outside the device towards the rear chamber 20 along the plunger 22 between the plunger and the piston initially, and then along the passage 34.

Figure 3:
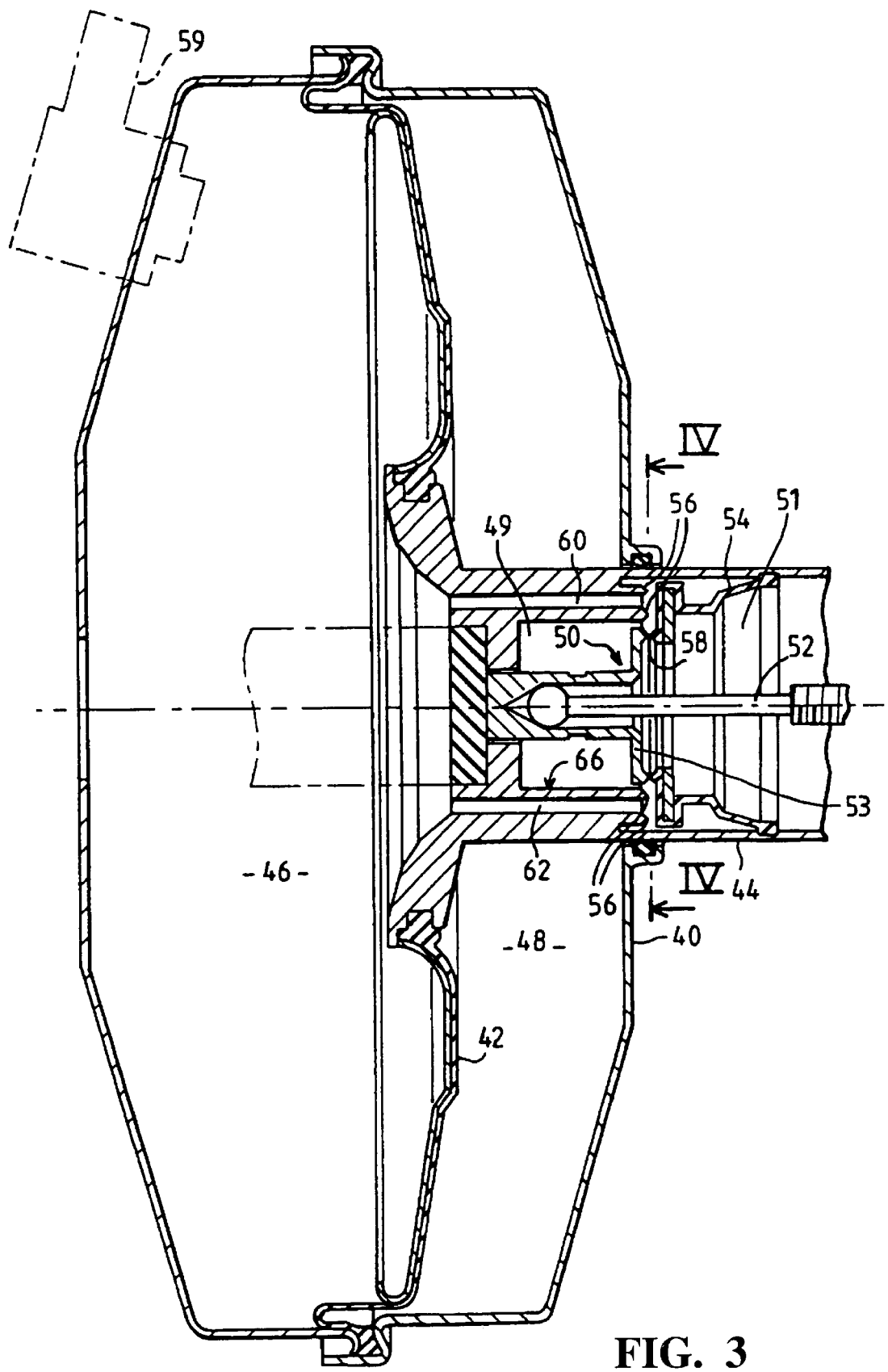
FIG. 3 is a diagrammatic view in longitudinal section of a brake booster according to the invention.
Figure 5:
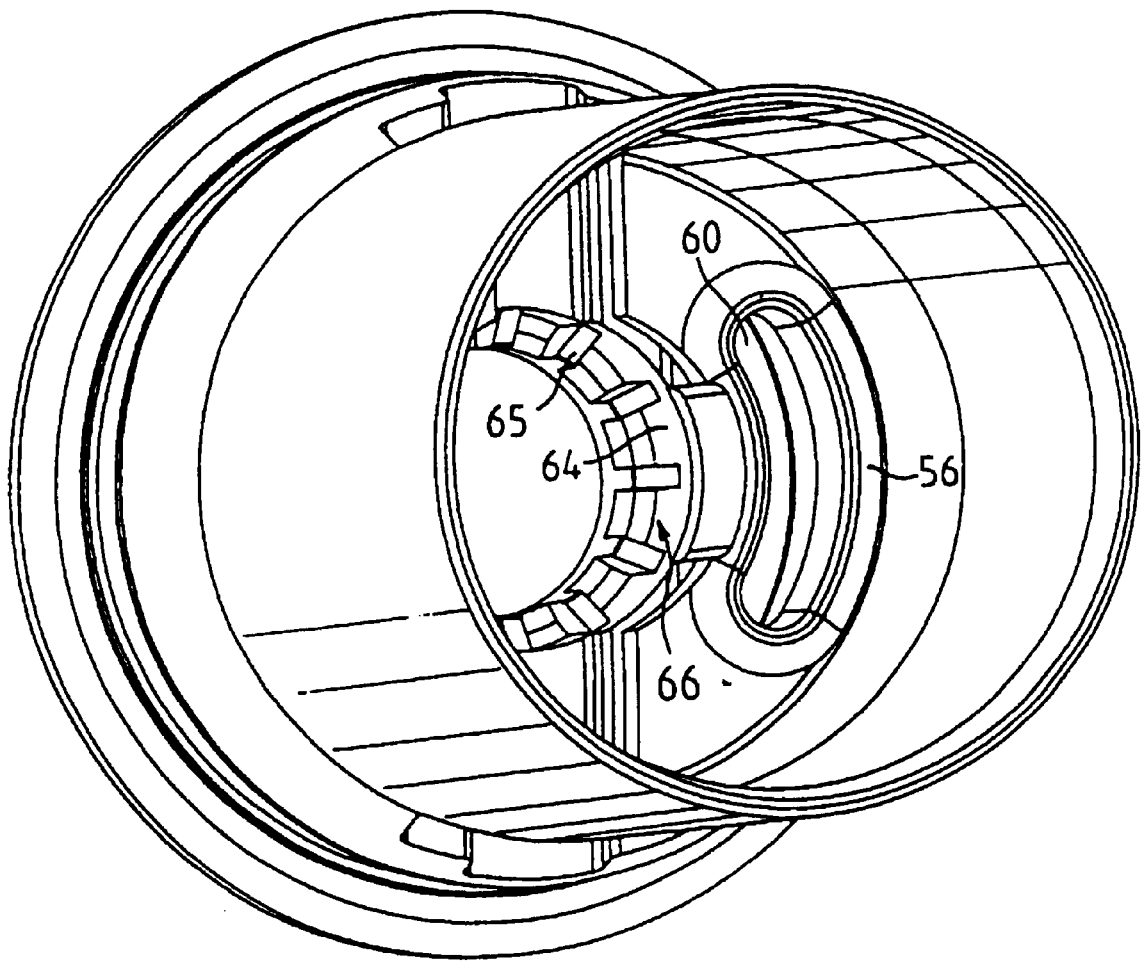
FIG. 5 is a perspective view of the piston of the booster of FIG. 3.

FIGS. 3 to 5 depict a first illustrative embodiment of a brake booster that allows this drawback to be remedied.

Like the brake booster depicted in FIG. 1, the device depicted in FIG. 3 comprises an enclosure 40 divided by a diaphragm 42 borne by a piston 44 that can be moved axially with respect to the enclosure, into a front chamber 46 and a rear chamber 48. Piston 44 defines therein a first chamber 49 and an adjacent second chamber 51.

A plunger 50 fitted with an operating rod 52 is mounted within chamber 49 of plunger 50 so that it can be moved axially in the piston 44 between a forward unstable braking position and a retreated stable position of rest. Plunger 50 has a flange 53 forming an axial wall between chambers 49 and 51 and carries a "vacuum" seat 58 facing chamber 51. As shown in FIG. 3, an annular opening or gap 57 is formed between the outer periphery of flange 53 and the inner diameter of piston 44.

A valve 54, which collaborates therein with "vacuum" 56 and "air" 58 seats borne respectively by the piston and by the plunger, allows for selective communication between the rear chamber 48 and either, when the plunger is in the position of rest, the front chamber 46, which is in constant communication with a source of vacuum via connecting means 59, or, during braking, the rear part of the piston 44 in which the pressure is equal to atmospheric pressure, that is to say that region of the piston which lies on the opposite to the chambers with respect to the valve 54. As is conventional, the braking force applied to the brake pedal is thus multiplied.

Referring to FIGS. 4 and 5, it can be seen that the seat 58 borne by the plunger 50 consists of a circular rib on which a corresponding surface of the valve 54 rests, while the seat 56 borne by the plunger 44 consists of the rear edge of passages 60 and 62 formed in the piston 44 and opening through a surface 61 of the piston adjacent to allow communication between the chambers 46 and 48.

As a preference, these passages 60 and 62 and the seats defined by the peripheral edge thereof each have a kidney-bean-shaped transverse cross section, that is to say a cross section in the shape of a truncated annulus, and the piston has two passages such as 60, 62 which are symmetric with respect to the axis of the piston.

It will be appreciated that this arrangement makes it possible to render the flow of air from the rear chamber towards the front chamber 46 substantially uniform by concentrating it in one region of the piston.

Referring to FIG. 5, it can be seen that the air flows towards the rear chamber 48 by passing through longitudinal grooves such as 64 delimited by radial ribs 65 formed in a bore 66 of the piston in which the plunger 60 slides, these grooves communicating with the rear chamber 48.

The ribs 65 allow the plunger 50 to slide with a small clearance.

Referring to FIG. 6, in which another illustrative embodiment of a brake booster according to the invention is depicted, it may be seen that it is possible, as an alternative, to provide a set of secondary passages such as 68 which open, on the one hand, at one end, into the rear chamber 48 and, on the other hand, at the opposite end, into the internal volume of the piston 44 in a region that preferably lies forward of the plane defined by the seat 56, so as to increase the air flow from the rear chamber 48 towards the front chamber 46 when the plunger 50 returns to the position of rest. The response time of the booster is thus decreased, initially by increasing the total cross section of the available passages and then by providing passages in which the air suffers less throttling and therefore less turbulence than it did in the previous case.

It will be appreciated that the invention which has just been described, which makes it possible to improve the flow of air towards the rear chamber and from the latter, also makes the piston easier to produce insofar as the seats can be produced therein by ejection from the mould using punches.

It will also be noted that such a piston can be used in various types of vacuum brake booster, particularly in boosters of the two-valve type.

Of course, any implementation of the invention may be adapted to the particular operating conditions of the booster. In particular, the invention is also applicable to a brake booster of the pressure type.

Finally, it is possible, as an alternative, to form the seat borne by the piston 44 with another shape, that is to say a configuration whereby it comprises two parts each surrounding one of the passages 60 and 62 and connected by a central part coaxial with the plunger.

What is claimed is:

1. A brake booster comprising:
   an enclosure;
   a diaphragm dividing the enclosure into a front chamber adapted for connection to a source of vacuum and a rear chamber;
   a piston movable axially in the enclosure and coupled to the diaphragm, the piston defining therein a first chamber communicating with the rear chamber and a second chamber axially adjacent the first chamber and communicating with ambient atmosphere, the piston further defining a passage therethrough communicating the second chamber and the front chamber and having a raised vacuum seat on a surface thereof around an opening of the passage into the second chamber, the piston further having a supplemental passage in the piston communicating the second chamber with the rear chamber, and opening into the second chamber through the surface with no raised seat;

a plunger mounted in the first chamber so that it can be moved axially in the piston under the control of a brake pedal between an unstable braking position and a retreated stable position of rest, the piston having a flange forming an axial wall between the first and second chambers, the axial wall having an annular circumferential air seat thereon facing the second chamber and defining with the piston an annular opening therebetween radially outside the annular circumferential seat and communicating the first and second chambers;

an annular valve member collaborating with the vacuum and air seats on the piston and on the plunger so as, when the valve engages only the air seat, to isolate the rear chamber from the ambient atmosphere and place it in communication with the front chamber when the plunger is in the position of rest and, when the valve engages only the air seat, to isolate the rear chamber from the front chamber and place the rear chamber in communication with the ambient atmosphere through the annular opening between the piston and the plunger and also through the supplemental opening through the piston during braking.

2. The brake booster of claim 1 wherein the opening of the supplemental passage through the surface of the piston into the second chamber is in the shape of a truncated arc.

3. The brake booster of claim 2 wherein the supplemental passage is one of a pair of such passages separated from one another and each having an opening through the surface of the piston into the second chamber.

* * * * *